Dec. 9, 1958      R. E. McNAMARA      2,863,519
AUTOMOBILE IGNITION HOOD, TRUNK AND 3 DOOR LOCK
Filed Aug. 16, 1955      3 Sheets-Sheet 1
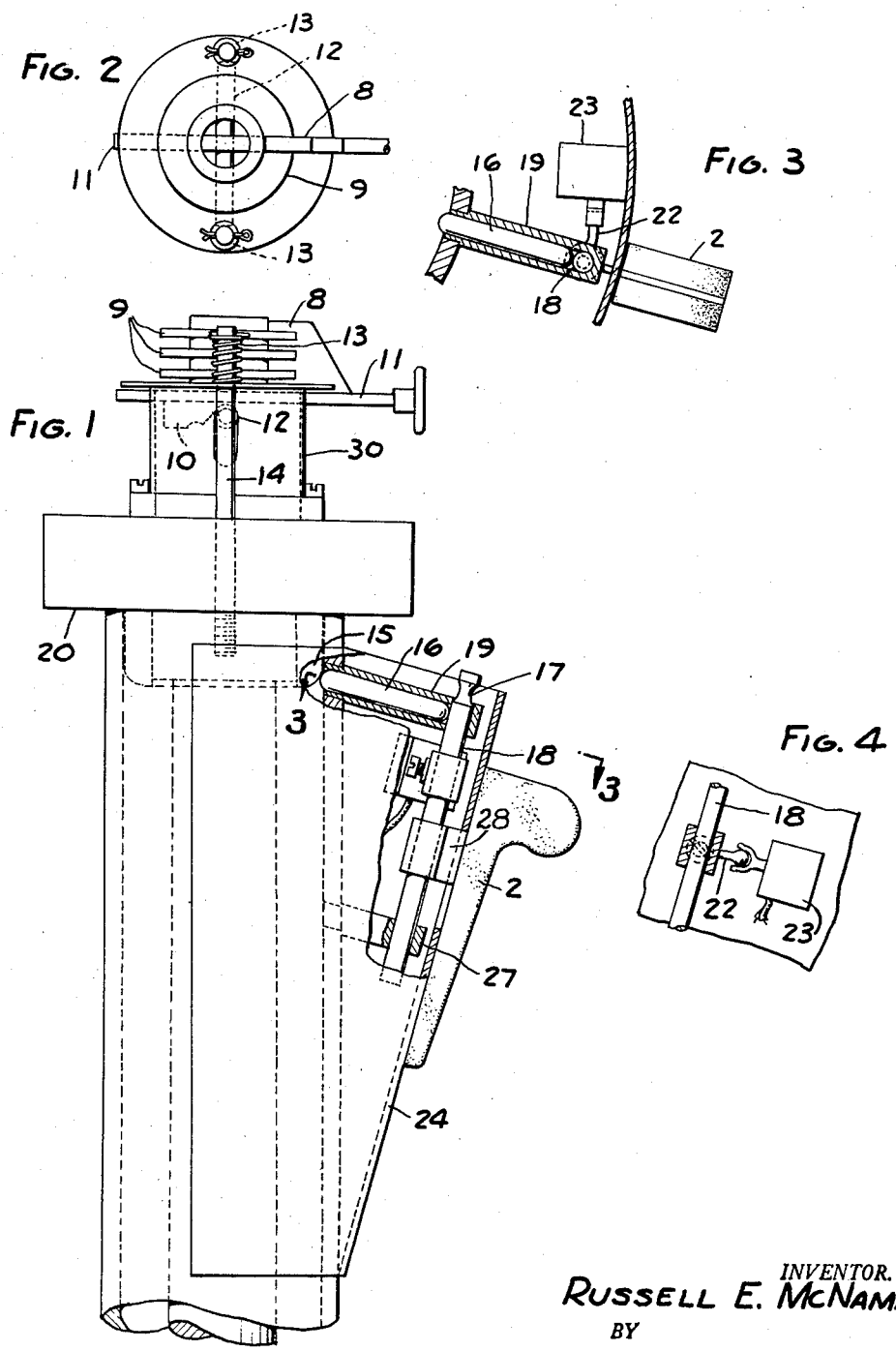
INVENTOR.
RUSSELL E. McNAMARA
BY
Barnes, Kisselle, Laughlin & Raisch
ATTORNEYS.

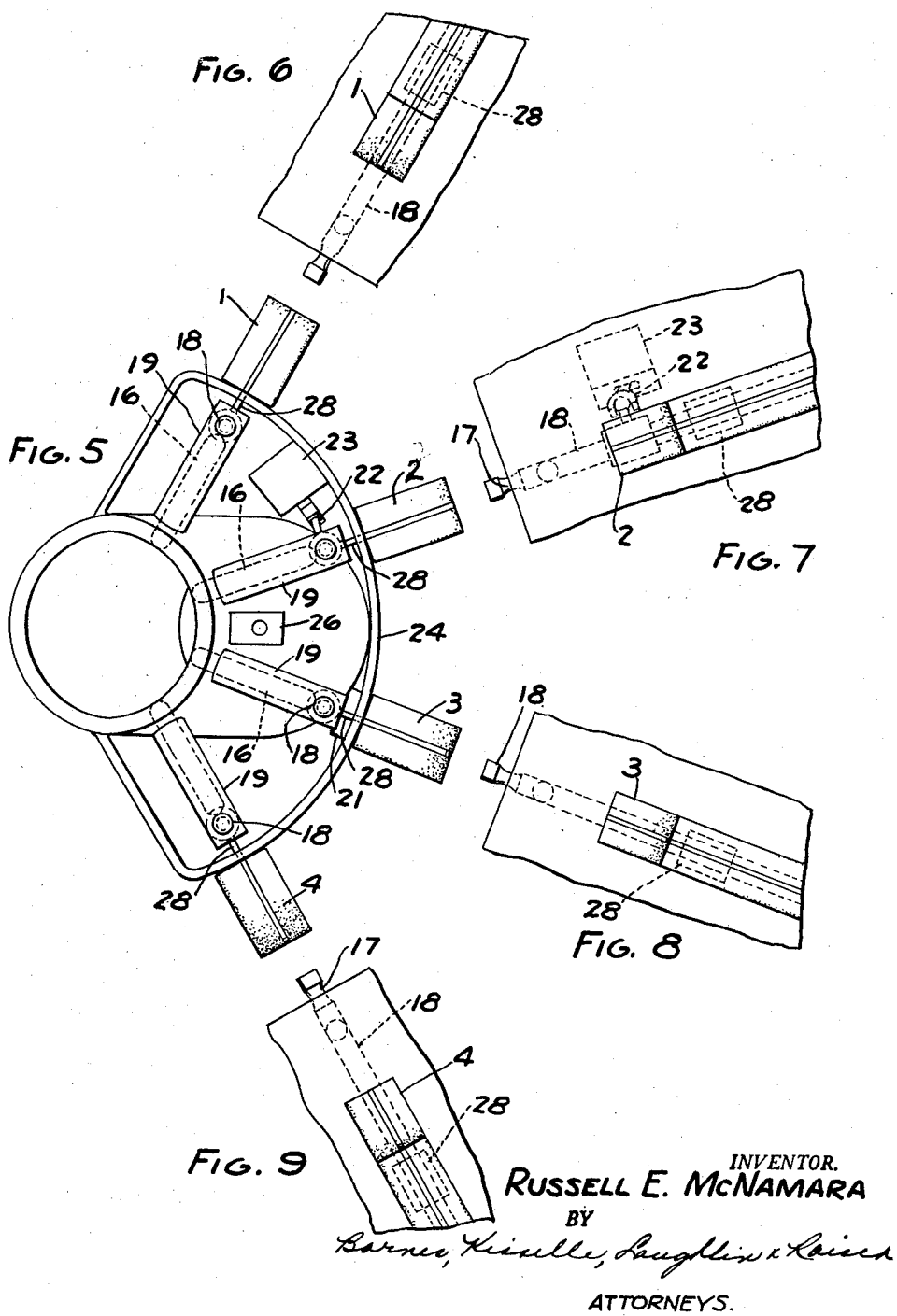

Dec. 9, 1958    R. E. McNAMARA    2,863,519
AUTOMOBILE IGNITION HOOD, TRUNK AND 3 DOOR LOCK
Filed Aug. 16, 1955    3 Sheets-Sheet 3
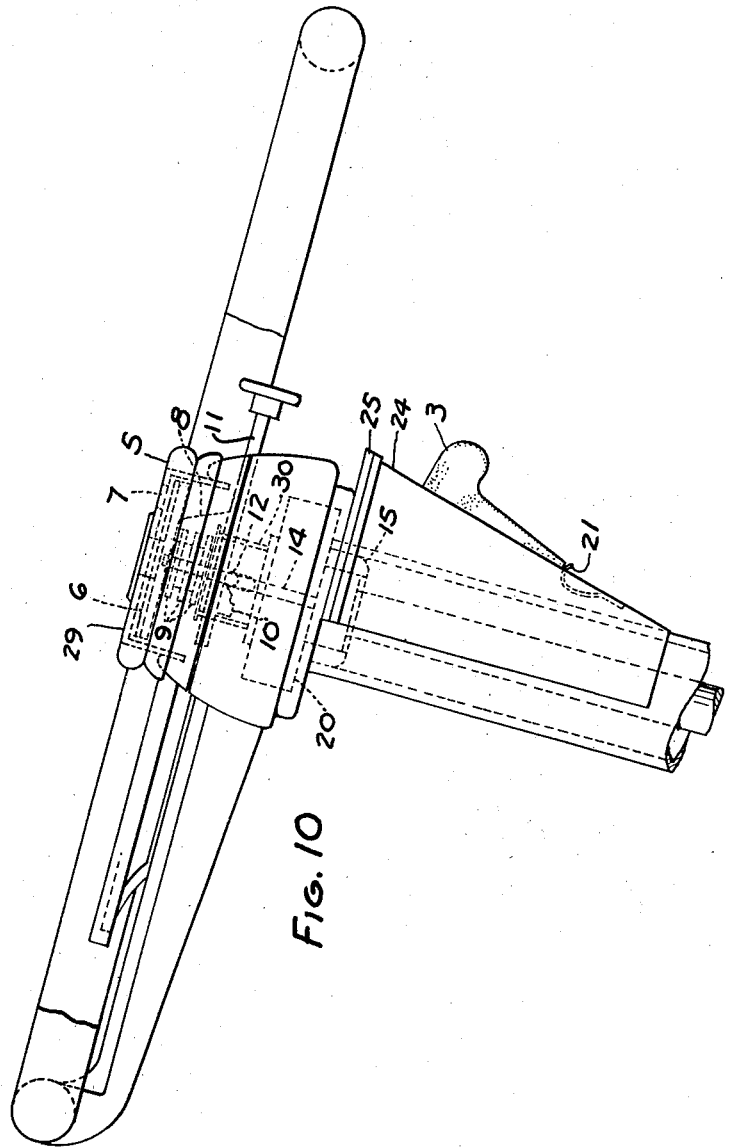
INVENTOR.
RUSSELL E. McNAMARA
BY
ATTORNEYS.

United States Patent Office 2,863,519
Patented Dec. 9, 1958

2,863,519

AUTOMOBILE IGNITION, HOOD, TRUNK AND 3 DOOR LOCK

Russell E. McNamara, Riverside, Ontario, Canada

Application August 16, 1955, Serial No. 528,575

16 Claims. (Cl. 180—82)

This invention relates to a locking device for an automotive vehicle which has features in common with the invention disclosed in Patent No. 2,270,850. The basic principle is the same, namely the use of a dial, tumblers and a master key. However in addition to locking the ignition the locking means of this invention also locks the hood, the trunk and the three doors other than the left front or driver's door. The ignition switch and wires therefrom are thoroughly enclosed to avoid tampering, the wires running down inside the steering column, to a convenient point, but under the hood, hence the hood should be locked to avoid tampering with the ignition wires. The locking or unlocking of the rear trunk from the driver's seat is a great convenience, as is the control of doors out of the driver's reach. The complete unit is mounted on a conventional automobile steering wheel and steering column.

The purpose of the invention is to prevent theft and to prevent the operation of the vehicle by a drunk driver or other person not in full control of his faculties, operation of the device requiring good vision, co-ordination of muscles and the exercise of reason and intelligence.

The drawings illustrating embodiments of the invention are as follow:

Fig. 1 is a fragmentary elevational view partly in section of a steering column and steering wheel base showing the tumblers, the master key and the supporting structure of the present locking device as well as the operating cam lock pin and control rod for the ignition switch.

Fig. 2 is a top plan view of the tumblers and the master key.

Fig. 3 is a sectional view along the line 3—3 in Fig. 1 showing the lock pin, control rod and ignition switch.

Fig. 4 is a projected side elevation of the control rod and ignition switch.

Fig. 5 is generally the top plan view of the steering column showing the casing of the locking device of this invention together with the lock pins, guide posts, control rods and fingers latches.

Fig. 6 is a projected side view of the hood control.

Fig. 7 is a projected side view of the ignition control.

Fig. 8 is a projected side view of the door control.

Fig. 9 is a projected side view of the trunk control.

Fig. 10 is a fragmentary side elevational view of the steering column and steering wheel embodying the locking device of the present invention.

Fig. 5 shows four different control stations. Finger latch 1 controls the hood lock, latch 2 controls the ignition switch, latch 3 controls the door locks and latch 4 the trunk lock. The locks controlled by latches 1, 3 and 4 can be operated directly by the latches themselves by means of cables extended from the latches to the locks or by means of electric switches that are actuated by the latches which in turn control the operation of the locks.

The tumblers 9 (Fig. 1) are each provided with slots that are adapted to be lined up when a proper combination of numbers are dialed with dial control 5. Dial control 5 comprises a dial 6 that is adapted to be read through a sight opening 7 in a cover 29. When the slots in the tumblers are vertically aligned, a master key 8 is arranged to be inserted in these vertically aligned slots, Figs. 1 and 2. This is the opened or unlocked position of the device which permits the operator to turn on the ignition or unlock the hood, trunk or the doors. The master key 8 and a cam member 10 are mounted on diametrically opposite sides of an axially shiftable control rod 11. When control rod 11 is shifted to the right from the position shown in Figs. 1 and 2 to bring the master key 8 out of the aligned slots in tumblers 9, the cam 10 forces a roller 12 downwardly. Roller 12 is supported by guide rods 14 and is biased upwardly into engagement with the operative face of cam 10 by compression springs 13 which surround the upper ends of these guide rods as shown in Figs. 1 and 2. At the lower end of guide rods 14, there is mounted a cam 15. When control rod 11 is shifted to the right from the position shown in Fig. 1 to move master key 8 out of the aligned slots in tumblers 9, roller 12 is engaged by cam 10 so as to shift guide rods 14 and cam 15 at the lower end downwardly and thereby compress springs 13.

With cam 15 in the lowered position (in Fig. 1 it is illustrated in the upper position), the latches 1, 2, 3 or 4 cannot be operated, because the lock pins 16 are prevented by the cam 15 from shifting radially inwardly when one of these latches is attempted to be shifted upwardly so as to move control rod 18 to a position wherein the other end of pin 16 is disengaged from the annular groove 17 in the control rod. Thus, in this lowered position of cam 15, since the latches cannot be shifted upwardly, the device is in the locked condition. Each lock pin 16 is slidably arranged within a sleeve 19, but its movement axially within sleeve 19 in response to movement or attempted movement of control rod 18 is determined by the position of cam 15.

As is shown in Figs. 1, 5 and 10, the mechanism actuated by latches 1, 2, 3 and 4 is all enclosed in a casing 24 provided with a cover 25. Cover 25 is arranged to be held in place by fastening to an anchor post 26 (Fig. 5). Within the casing 24, it will be observed that each of the finger latches 1, 2, 3 and 4 is connected to its respective control rods 18 by a ferrule 28 which is fixed to the finger latch and to the control rod. The control rods 18 are guided for axial movement at the lower end by a secondary guide post 27 and at the upper ends by an extension of sleeve 19. The tumbler mechanism is mounted on a support 30 as shown in Fig. 1.

After correct dialing with dial control 5, master key 8 is inserted in the lined up slots in tumblers 9. This is the open or unlocked position allowing one to turn on the ignition or unlock the hood, trunk or doors. Master key 8 and auxiliary key 10 are integral with key rod 11. With master key 8 out of position of the slots in tumblers 9 auxiliary key 10 forces roller 12 downward compressing springs 13 and forcing guide rods 14 and cam 15 downward. Roller 12 being assembled into guide rods 14 with cam 15 in this down position one cannot operate latches 1, 2 or 4 because the end of lock pin 16 is unable to move from groove 17 in control rod 18 thereby locking control rod 18 in position. Lock pin 16 is retained in guide post 19, can move freely, but movement is controlled laterally by cam 15 and control rod 18. To reverse or unlock the unit, the lock is dialed correctly and the master key 8 is then depressed. Auxiliary key 10 moves off roller 12, releasing tension on springs 13 which moves guide rods 14 and cam 15 upwards. Cam 15 rests against the lower side of the steering wheel base 20. Lock pin 16 is now free to move laterally. By lifting finger latches 1, 2 or 4, control rods will make the desired contacts. Latch 3 controlling the doors is used to unlock the doors only. When pulled up, the doors are automatically unlocked and they remain unlocked as spring 21 holds the latch finger 3 in unlocked position until pressed down.

Latch finger 2 controls the ignition switch. Switch operating finger 22 is fastened to control rod 18, switching current on and off in switch 23 as control rod 18 is moved up or down.

I claim:

1. In an automotive vehicle, means for remotely controlling the operation of latches such as employed on the doors, trunk lid and hood comprising a housing, a plurality of control rods shiftable axially in said housing, said control rods, when shifted axially, actuating said latches, means connected to said control rods and extending through said housing to enable manual shifting of said control rods, a combination lock comprising a plurality of discs each provided with a notch at the periphery thereof, a master key which is movable into the slot provided by said notches when vertically aligned, a cam member operably connected with said master key, lock means engageable with said control rods to prevent axial movement thereof to thereby maintain the latches in latched condition, a cam follower associated with said last mentioned means and actuated by said cam to lock said control rods against axial movement when said key is retracted out of said aligned notches.

2. The combination set forth in claim 1 wherein said lock means are biased to a position out of engagement with said control rods.

3. The combination set forth in claim 1 wherein said lock means includes a plurality of lock pins movable into the path of movement of said control rods to prevent axial movement of said control rods in a direction to unlock said latches and means engaged by said cam follower to move said lock pins to said last mentioned position.

4. The combination set forth in claim 3 wherein said control rods are disposed in side by side relation within said housing, said lock pins being arranged in said housing in radial fashion and said last mentioned means comprises an abutment having a cam surface engageable with the inner ends of said lock pins.

5. The combination set forth in claim 4 wherein said control rods are fashioned with a notch therein, the outer ends of said lock pins being adapted to engage in said notches when the lock pins are shifted radially outwardly to thereby prevent axial movement of the control rods.

6. In an automotive vehicle, means for controlling the operation of remote devices such as latches and the like from the position of the driver comprising a housing in the vehicle located adjacent the driver's position, a plurality of control rods in said housing which are axially movable to control said devices, means for preventing axial movement of said control rods to prevent actuation of said devices comprising a first member shiftable in opposite directions, a second member having a cam connection with said first member and movable in response to shifting of said first member, a plurality of lock pins engaged by said second member to move to a position interlocking with said control rods to thereby prevent axial shifting movement of said control rods, and including a combination lock having a plurality of discs each provided with a notch in the peripheral edge thereof, said first member being shiftable into the slot provided by the notches when vertically aligned.

7. The combination set forth in claim 6 wherein said housing is fixedly mounted on the steering column housing of the vehicle and including means connected with said control rods and extending through said first mentioned housing for manually actuating said control rods.

8. In an automotive vehicle, means for controlling the operation of remote devices on the vehicle such as latches and the like from the position of the driver comprising a housing associated with the steering column housing of the vehicle, a plurality of control rods in said housing shiftable in a direction axially of the steering column housing, means extending through one of said housings for enabling the driver of the vehicle to manually shift said control rods, means in said first mentioned housing engageable with said control rods to prevent axial movement thereof and thereby prevent operation of said devices, said last mentioned means comprising a first member shiftable in opposite directions comprising a mechanism mounted within the rotatable hub of the steering wheel on the said steering column housing, said mechanism having a member extending outwardly through said hub for actuating said mechanism and means in said first mentioned housing operatively connected between said control rods and said mechanism for locking said control rods against axial shifting movement when said member is actuated.

9. The combination set forth in claim 8 wherein said last mentioned means comprises a plurality of lock pins each associated with one of said control rods, said lock pins being arranged in a radial fashion, said mechanism including an annular member rotatable with the steering wheel and engageable with the inner ends of said lock pins.

10. The combination set forth in claim 9 wherein said annular member is disposed concentrically with the axis of rotation of said steering wheel and is shiftable by said mechanism in a direction along the axis of the steering column.

11. The combination set forth in claim 10 including a cam operatively associated with said member extending outwardly from the hub of the steering wheel, said annular member having a cam follower engaging said cam so that movement of said cam produces axial movement of said annular member.

12. The combination set forth in claim 11 including a combination lock arranged within the rotatable hub of the steering wheel and rotatable therewith, said combination lock including a plurality of super-imposed discs each provided with a notch in the outer periphery thereof, said member extending outwardly from said hub comprising a master key shiftable into the slot provided by said notches when vertically aligned and including means biasing said annular member in a direction out of engagement with the inner ends of said lock pins when the master key is engaged with the vertically aligned notches.

13. The combination set forth in claim 12 including a supporting plate mounted within and to rotate with the hub of the steering wheel, said annular member having a pair of guide pins thereon, said guide pins extending upwardly through said supporting plate and vertically slidable relative thereto.

14. The combination set forth in claim 13 including compression springs arranged between the free ends of said guide pins in said supporting plate.

15. The combination set forth in claim 14 wherein one of said control rods is arranged to actuate the ignition switch of the vehicle.

16. In an automotive vehicle, means for controlling the operation of remote devices such as latches and the like from the position of the driver comprising a housing in the vehicle located adjacent the driver's position, a plurality of control rods in said housing which are axially movable to control said devices, means for preventing axial movement of said control rods to prevent actuation of said devices comprising a first member shiftable in opposite directions, a second member having a cam connection with said first member and movable in response to shifting of said first member, a plurality of locking pins arranged between said second member and said control rods, said locking pins being movable in one direction into the path of movement of said second member and being movable in the opposite direction into the path of movement of said control rods, said second member in one position thereof holding said locking pins in a position interlocking with and preventing movement of said control rods to thereby prevent operation of said remote devices and including separate locking means movable into and out of the path of movement of the first member for selectively preventing a movement of the said first member in a direction to unlock said locking pins.

References Cited in the file of this patent

UNITED STATES PATENTS

| | | |
|---|---|---|
| 1,825,413 | Norviel | Sept. 29, 1931 |
| 1,833,572 | Hardesty | Nov. 24, 1931 |
| 1,893,406 | Geraghty | Jan. 3, 1933 |
| 1,907,705 | Armstrong | May 9, 1933 |
| 2,270,850 | McNamara | Jan. 27, 1942 |
| 2,450,372 | Craig | Sept. 28, 1948 |
| 2,613,258 | Azano | Oct. 7, 1952 |
| 2,718,776 | Moore | Sept. 27, 1955 |